United States Patent [19]

Sybert

[11] Patent Number: 5,344,910

[45] Date of Patent: Sep. 6, 1994

[54] HEAT-RESISTANT POLYCARBONATE RESINS CONTAINING 2-ALKYL-3,3-BIS(P-HYDROXYPHENYL)PHTHALIMIDE

[75] Inventor: Paul D. Sybert, Evansville, Ind.

[73] Assignee: General Electric Company, Pittsfield, Mass.

[21] Appl. No.: 35,843

[22] Filed: Mar. 23, 1993

[51] Int. Cl.$^5$ ............................................. C08G 64/00
[52] U.S. Cl. ................................... 528/201; 528/125; 528/171; 528/172; 528/173; 528/174; 528/176; 528/190; 528/202; 528/203; 528/204
[58] Field of Search ............... 528/201, 202, 203, 204, 528/125, 171, 172, 173, 174, 176, 190

[56] References Cited

U.S. PATENT DOCUMENTS 4,134,936  1/1979  Byrne et al. ..................... 528/201

Primary Examiner—John Kight, III
Assistant Examiner—Terressa Mosley

[57] ABSTRACT

Polycarbonate resins containing repeating or recurring polymer chain units of the formula:

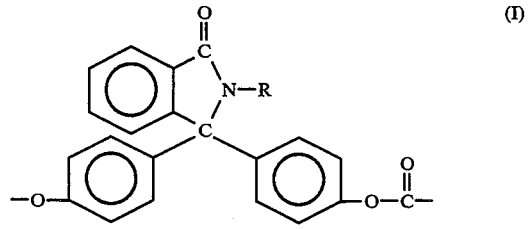

(I)

wherein R represents alkyl are useful in high temperature applications, when thermoplastically molded into articles.

8 Claims, No Drawings

HEAT-RESISTANT POLYCARBONATE RESINS CONTAINING 2-ALKYL-3,3-BIS(P-HYDROXYPHENYL)PHTHALIMIDE

BACKGROUND OF THE INVENTION

1. Field of the Invention

The invention relates to polycarbonate resins and more particularly to thermoplastic, aromatic polycarbonate resins useful for molding articles which are stable under relatively high temperature conditions.

2. Brief Description of Related Art

Phenolphthalein, as a dihydric phenol reactant, has been used to prepare polycarbonate resins; see for example the disclosures in U.S. Pat. Nos. 3,036,036; 3,036,037; 3,036,039; 4,078,999; 4,167,536; and 4,310,652. Phenolphthalein has also been used as a reactant in admixture with bisphenol-A to prepare copolycarbonate resins; see for example Lin, M.S. and E.M. Pearce, Polymers With Improved Flammability Characteristics, II: Phenolphthalein Related Copolycarbonates, Journal of Polymer Science: Polymer Chemistry Edition, (1981) 19: p.2151–2160. Poly(ester-carbonates) prepared with phenolphthalein reactant are also known; see U.S. Pat. No. 4,310,652.

The phenolphthalein copolycarbonates exhibit excellent ductility and high heat-distortion temperatures. However, the presence of even small quantities of phenolphthalein residues in the product resins, or in the brine medium used in preparation affords discolored resin and recycle water (pink coloration). This is not desirable for many commercial purposes. It has also been reported (Lin, M.S. and E.M. Pearce, Polymers With Improved Flammability Characteristics. I. Phenolphthalein Related Homopolymers. Journal of Polymer Science: Polymer Chemistry Edition, (1981) 19: p.2659–2670) that phenolphthalein based polycarbonate resins are difficult to melt process because of cross-linking and chain scission through the lactone ring; see also Lin, M.S., B.J. Bulkin, and E.M. Pearce, Thermal Degradation Study of Phenolphthalein Polycarbonates, Journal of Polymer Science: Polymer Chemistry Edition, (1981) 19: p.2773–2797 at page 2774.

Certain derivatives of phenolphthalein have also been used as dihydric phenols to prepare polycarbonate resins. For example, Lin and Pearce, I: Pgs. 2151–2160, supra., describe preparation of polycarbonate homopolymer resins wherein 3,3-bis(p-hydroxyphenyl)phthalimidine and 2-phenyl-3,3-bis(p-hydroxyphenyl)phthalimidine were separately polymerized (phosgenated).

We have found the copolymerization of 3,3-bis(p-hydroxyphenyl)phthalimide with bisphenol-A polycarbonate to be extremely difficult because of what appears to be concurrent side reactions through the amide hydrogen during polymerization. These side reactions cause emulsification during interfacial polymerizations, which hinders pH control, molecular weight control and work up of the polymer.

Copolymers of 2-phenyl-3,3-bis(p-hydroxyphenyl)phthalimidine were found to have poor melt stability during melt processing resulting in foamy polymer melts and moldings, and discoloration of the resin during melt processing.

Aromatic polyesters of phenolphthalein were found to have better UV stability than both the bisphenol-A and phthalimidine aromatic polyester. (See P. W. Morgan, Linear Condensation Polymers From Phenolphthalein and Related Compounds, Journal of Polymer Science: Part A, (1964) 19: 437–459). The phthalimidine copolymers are reported to rapidly discolor on UV exposure. These results suggest that the alkyl phthalimidine polycarbonates would also have poor UV stability. Contrary to these results, we have found that these copolymers have excellent UV stability (comparable to bisphenol-A based polycarbonate).

We have also found that selected phenolphthalimidine homo and copolycarbonates are useful in the same applications found useful for phenolphthalein copolycarbonates, but advantageously articles molded from them are more UV stable, have adequate melt stability and good ductility. The phenolphthalimidine based polymer resins are also free of the objectionable coloration associated with the phenolphthalein monomer, homo and copolycarbonates.

Other advantages of the resins of the invention will be described more fully below.

SUMMARY OF THE INVENTION

The invention is of polycarbonate resins for molding ductile articles possessing resistance to heat degradation, which comprises;

a synthetic polymeric resin containing recurring or repeating polycarbonate chain units of the formula:

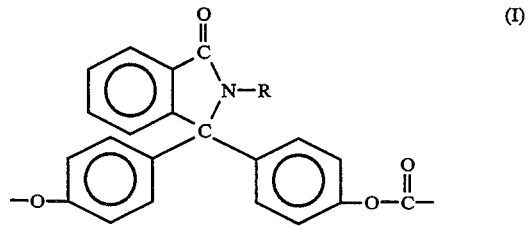

wherein R represents alkyl, preferably lower alkyl.

The resins are thermoplastically moldable. Molded articles prepared from the resins of the invention are ductile and thermally stable at relatively high temperatures.

The term "alkyl" as used herein means the monovalent moiety obtained upon removal of a hydrogen atom from an alkane having 1 to 12 carbon atoms, inclusive. Representative of alkyl are alkyl such as methyl, ethyl, propyl, butyl, pentyl, hexyl, heptyl, octyl, nonyl, decyl, dodecyl, undecyl and isomeric forms thereof. The term "lower alkyl" means alkyl of 1 to 4 carbon atoms, inclusive.

DETAILED DESCRIPTION OF THE PREFERRED EMBODIMENTS OF THE INVENTION

The polycarbonate resins of the invention having repeating chain units of the formula (I) given above (homopolymers) may be prepared by polymerizing dihydric monomers of the formula:

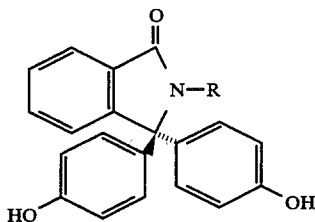

(II)

wherein R is as defined above. Representative of the monomers of formula (II) are 2-methyl-3,3-bis(p-hydroxyphenyl)phthalimide, 2-butyl-3,3-bis(p-hydroxyphenyl)phthalimide, 2-octyl-3,3-bis(p-hydroxyphenyl)phthalimide and the like. The monomers (II) are readily prepared by the reaction of a corresponding primary alkylamine with phenolphthalein using known and conventional methods; see for example the method of R. Albert, Ber., 26, 3077, (1893). Representative of the primary alkylamines are methylamine, ethylamine, propylamine, butylamine, pentylamine, hexylamine, heptylamine, octylamine, nonylamine, decylamine and the like.

The polycarbonate resins of the invention include those having recurring or repeating chain units of the formula (I) given above, interrupted by chain units of the formula:

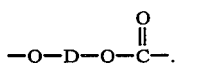

(III)

wherein D is a divalent aromatic moiety of the formula:

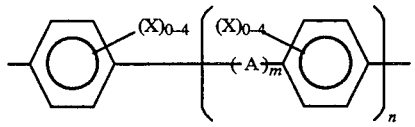

(IV)

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)$_2$—; —O—; or —C(O)—; each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and m is zero or 1 and n is an integer of from 0 to 5.

The polycarbonate resins of the invention which include interrupting chain units of the formula (III) given above (copolycarbonates) may be prepared by polymerizing mixtures of the dihydric monomers of formula (II) with dihydric phenols of the formula:

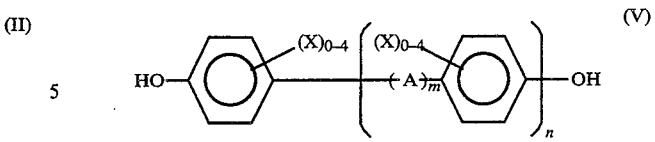

(V)

wherein A, X, m and n have the meanings previously ascribed to them. The proportions of dihydric reactants of formula (II) and (V) used in the mixtures may be within the range of about 0.5:99.5 to 99.5:0.5 (II:V) weight percent.

Representative of the dihydric phenols of formula (V) given above are bis-phenols such as (4-hydroxyphenyl)methane, 2,2-bis(4-hydroxyphenyl)-propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxy-phenyl) sulfoxide and bis(3,5-dibromo-4-hydroxy-phenyl) sulfoxide. A variety of additional dihydric phenols are available and are disclosed in U.S. Pat. Nos. 2,999,835; 3,028,365 and 3,153,008; all of which are incorporated herein by reference thereto. It is, of course, possible to employ two or more different dihydric phenols or a combination of a dihydric phenol with a glycol.

Polymerization of the monomers of formula (II) with or without the presence of the dihydric phenols of formula (V) given above may be carried out by interfacial polymerization technique, well known to those skilled in the art; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto. The method is also described by P. W. Morgan, J. Polym. Sci., 2(a) , 437–459, (1964).

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the dihydric phenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

Advantageously a catalyst is added to the reaction mixture to promote the reaction. The catalyst employed accelerates the rate of polymerization of the dihydric phenol reactants with the carbonate precursor. Representative catalysts include but are not limited to tertiary amines such as triethylamine, quaternary phosphonium compounds, quaternary ammonium compounds, and the like.

In the conventional interfacial polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, para-tertiarybutylphenol, p-cumylphenol and the like. Techniques for the control of molecular weight are well known in the art and are used for controlling the molecular weight of the resins of the present invention. Advantageously the weight average molecular weight ($M_w$) of the resins of the invention are in the range of from about 10,000 to about 60,000 Daltons as measured by gel permeation chromatography.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bis-chloroformates of 2,2-bis(4-hydroxyphenyl)-propane, 2,2-bis(4-hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

The preferred process for preparing the polycarbonate resins of the invention comprises a phosgenation reaction. The temperature at which the phosgenation reaction proceeds may vary from below 0° C., to above 100° C. The phosgenation reaction preferably proceeds at temperatures of from about room temperatures (25° C.) to 50° C. Since the reaction is exothermic, the rate of phosgene addition may be used to control the reaction temperature. The amount of phosgene required will generally depend upon the amount of the dihydric phenol reactant added.

The polycarbonate resins of the invention may also contain in the resin chain, interrupting ester units of the formula:

—O—Y—O—D— (VI)

wherein D has the meaning previously ascribed to it and Y is a divalent moiety, the residue of a dicarboxylic acid after phosgenation. Such resins are referred to commonly as "polyester-carbonates", a class of polycarbonate.

The polyester-carbonates of the present invention are less preferred for certain applications (in comparison to the polycarbonates of the invention which lack ester units in the chain) because they may yield molded articles exhibiting a lower degree of ductility and a high degree of yellowing (as measured by YI) when exposed to UV light. However, where these particular properties are not critical, the polyester-carbonates of the present invention find use.

The polyester-carbonate resins of the invention may also be prepared by the interfacial polymerization technique described above, modified by inclusion in the reaction mixture of a proportion of a dicarboxylic acid (the ester precursor); see for example the U.S. Pat. Nos. 3,169,121 and 4,487,896 which are incorporated herein by reference thereto.

In general, any dicarboxylic acid conventionally used in the preparation of linear polyesters may be utilized in the preparation of polyester-carbonate resins. However, the polyester-carbonate resins of the present invention are preferably prepared with aromatic dicarboxylic acids of the formula:

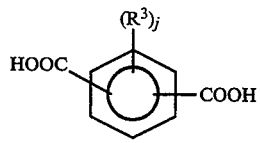

VII wherein j is a positive whole integer having a value of from 0 to 4 inclusive; and each $R^3$ is independently selected from the group consisting of alkyl radicals, preferably lower alkyl.

Particularly preferred dicarboxylic acids within the scope of the formula (VII) given above are terephthalic acid, and mixtures thereof with isophthalic acid wherein the weight ratio of terephthalic acid to isophthalic acid is in the range of from about 100:1 to about 1:100.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride.

The proportions of reactants employed to prepare the copolycarbonate resins of the invention will vary in accordance with the proposed use. In general, when the product resin contains chain units of the formulae (I) and (III), the weight ratio of the units will be within the range of from about 0.5:99.5 to about 99.5:0.5 (I:III) weight percent. When ester units of the formula (VI) are present, they are preferably within the proportional range of from about 10 to about 80 weight percent, relative to the carbonate units.

The polycarbonate and copolycarbonate resins of the invention may be used as the base ingredient of thermoplastically moldable blends, i.e.; base resins modified by the addition of additives conventionally used in the art of plastics compounding. Such additives can include fillers (such as clay or talc), supplementary delustrants, reinforcing agents (such as glass fibers), impact modifiers, antistats, plasticizers, flow promoters and other processing aids, stabilizers, colorants, mold release agents, ultraviolet screening agents, drip inhibitors such as polytetrafluoroethylene (PTFE), supplementary or synergistic flame retardants, and the like.

Preferred blend compositions of the invention include a heat distortion temperature improving proportion of a polyimide resin, preferably elastomeric in character. A heat distortion temperature improving proportion is generally one within the range of from 0.1 to 10 percent by weight of the resin blend. This particular additive is particularly compatible with the polycarbonates of the invention, described above, lessening the adverse effect one might expect, on other desired physical properties of the articles molded from the blend (such as notched Izod strengths and the like).

The polyimide polymers employed as additives in preferred blend compositions of the invention are exemplified by resins containing recurring or repeating chain units of the formula:

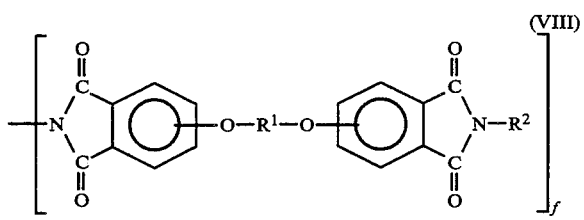

wherein f is an integer of from about 10 to about 500; $R^2$ represents a divalent aliphatic hydrocarbon radical containing from 2 to about 12 carbon atoms, a divalent aromatic hydrocarbon of 6 to 20 carbon atoms, a halogenated hydrocarbon radical containing from 6 to 18 carbon atoms, or a divalent cycloaliphatic hydrocarbon radical containing from 3 to about 10 carbon atoms; and $R^1$ is a divalent aromatic organic radical having from 6 to 30 carbon atoms inclusive.

Illustrative of a particularly preferred polyetherimide resin are those containing recurring chain units falling within the scope of Formula (VIII) wherein $R^2$ is phenylene and $R^1$ is the divalent moiety of formula:

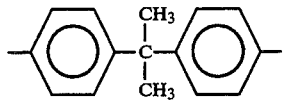

In general, the polyetherimides within formula (VIII) given above may be prepared by the reaction of an aromatic bis(ether anhydride) of the formula:

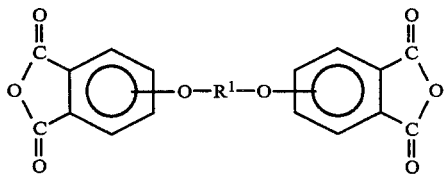

wherein $R^1$ is as defined above, with an organic diamine of the formula:

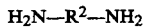

where $R^2$ is as defined hereinbefore.

Aromatic bis(ether anhydride)s of the above formula (X) include, for example, 2,2-bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)-diphenyl-2,2-propane dianhydride; and mixtures of such dianhydrides.

Organic diamines of the formula (XI) include, for example, m-phenylenediamine, p-phenylenediamine, 4,4'-diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminonaphthalene, 3,3'-dimethyl-benzidine, 3,3'-dimethoxybenzidine, 2,4-bis(β-amino-t-butyl) toluene, bis(p-β-amino-t-butylphenyl)ether, bis(p-β-methyl-o-aminophenyl)-benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecane-diamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl)tetramethyldisiloxane, and the like.

In general, the preparative reaction can be advantageously carried out employing well-known solvents, e.g., o-dichlorobenzene, m-cresol/toluene and the like to effect interaction between the bis(ether anhydride) (X) and the diamines (XI), at temperatures of from about 100° to about 250° C. Alternatively, the polyetherimides can be prepared by melt polymerization of any of the aforementioned dianhydrides (X) with any of the aforementioned diamine (XI) compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed.

The conditions of the reaction and the proportions of ingredients can be varied widely depending on the desired molecular weight, intrinsic viscosity, and solvent resistance. In general, equimolar amounts of diamine (XI) and dianhydride (X) are employed for high molecular weight polyetherimides. However, in certain instances, a slight molar excess (about 1 to 5 mole percent) of diamine (XI) can be employed resulting in the production of polyetherimides having terminal amine groups.

Generally, useful polyetherimides have an intrinsic viscosity [η] greater than 0.2 deciliters per gram, preferably 0.35 to 0.60, or 0.7 deciliters per gram measured in m-cresol at 25° C.

Included among the many methods of making the polyetherimides are those disclosed in U.S. Pat. Nos. 3,803,085; 3,847,867; 3,847,869; 3,850,885; 3,852,242; 3,855,178 and 3,905,942. These disclosures are incorporated herein in their entirety by reference for the purpose of teaching, by way of illustration, general and specific methods for preparing polyetherimides for use in the blends of this invention.

Preferred blend compositions of the invention may be include a flame retarding proportion of a silicone-polyimide copolymer resin. This particular flame retarding additive is particularly compatible with the blend of a poly(ester carbonate) and polyimide, described above, lessening the adverse effect one might expect, on other desired physical properties of the articles molded from the blend (such as heat distortion temperature, notched Izod strengths and the like).

The silicone-polyimide copolymers employed as fire-retarding additives in preferred compositions of the invention are exemplified by resins containing recurring or repeating chain units of the formula (VIII) given above interrupted by polysiloxane units of the formula:

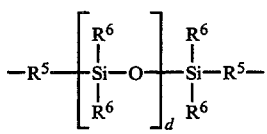

(XII)

wherein each $R^5$ represents a divalent hydrocarbon radical having 1 to 14 carbon atoms; each $R^6$ is independently selected from monovalent hydrocarbon radicals having 1 to 14 carbon atoms; and d is an integer of from 4 to 40.

The silicone-polyimide resins described above are generally well-known compounds, which may be prepared by a number of known methods; see for example the procedures described in U.S. Pat. Nos. 4,690,997 and 4,808,686 incorporated herein by reference thereto. In general, the method of preparation may be by reaction between amino-terminated polydiorganosiloxanes of the formula:

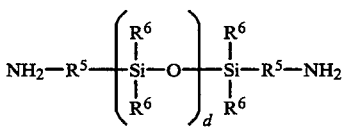

(XIII)

wherein $R^5$, $R^6$ and d have the meanings previously ascribed to them; and an organic diamine of the formula (XI) given above; with a substantially equal molar proportion of an aromatic bisanhydride of the formula (X) given above.

The amine-terminated polydiorganosiloxanes (XIII) are also well-known compounds which may be prepared by the procedures described in the U.S. Pat. No. 3,185,719 (Prober) which is hereby incorporated herein by reference thereto.

Flame-retarding proportions of the silicone-polyimides employed in the preferred blends of the invention are relatively minor amounts, i.e.; less than about 5 parts by weight of the total blend composition. Preferably, a flame-retarding proportion is within the range of from about 1 to 3 parts by weight and most preferably about 2 parts.

The preferred silicone-polyimide resins for use in the present invention contain about 20 to 60 weight percent of siloxane units of the formula (XI) given above.

Blend compositions of the invention may also contain minor proportions (less than 50 weight percent) of conventional and previously known polycarbonate resins.

The production of the blend compositions of the invention is done by any of the blending operations known for the blending of thermoplastic resins, for example blending in a kneading machine such as a Banbury mixer or an extruder. The sequence of addition is not critical but all components should be thoroughly blended together. Blending can be done continuously or batchwise. Melt blending can also be employed.

The invention will be better understood with reference to the following preparations and examples, which are presented for purposes of illustration rather than for limitation, and which set forth the best mode contemplated for carrying out the invention.

Where reported, the following test procedures were followed:

Heat Distortion Temperature Under Load (DTUL) of the molded samples was determined according to ASTM D-256.

Notched Izod (NI) impact on 125 mil and 250 mil thick molded samples were determined according to ASTM D-256.

Flexural Modulus (FM) was determined according to ASTM D-790.

Glass Transition Temperature (Tg) was determined by differential scanning calorimetry (DSC) using a DuPont 900 thermal analyzer and is reported as °C.

Intrinsic Viscosity (IV) measurement was carried out at a temperature of 30° C. in methylene chloride and is reported as deciliter/gram (dl/g).

Dynatup Impact

Dynatup impact measurements were made in a Dynatup autoloader machine using 125 mil thick 10.16 cm discs. The tup impact velocity was 12.2 ft/sec giving an impact energy of 148 ft-lb. The average energy to maximum load of three measurements is reported.

Tensile Properties were determined according to ASTM test method D-638.

Melt Volume Index (MVI) determined by ASTM Test Method D-1238 at a temperature of 300° C. under the indicated load and reported as cc/10 min.

Specific Gravity by ASTM test method D-792.

Yellowing Index (YI) was determined under accelerated aging conditions (QUV) by the test method ASTM D-1925. The test result is given in hours of light exposure after aging in a QUV Accelerated Weathering Tester with QVA 351 lamps. The cycle is 4 hours dark, 8 hours light. The change in yellowness was measured on an XL-835 colorimeter from Pacific Scientific Gardner Laboratory.

Molecular Weight ($M_w$)

The weight average molecular weight (Mw) was determined by gel permeation chromatography (GPC) in methylene chloride relative to polycarbonate standards using a UV detector at 254 nm.

All parts are by weight unless otherwise stated.

EXAMPLE 1

Preparation Of 2-methyl-3,3-bis(p-hydroxyphenyl)phthalimide (22 Mol %)-BPA Copolycarbonate A slurry of 77.15 gms (0.3379 mol) of bisphenol-A (BPA), 31.59 gms (0.09532 mol) of 2-methyl-3,3-bis(p-hydroxyphenyl)phthalimide (MPP), 2.759 gms (0.01300 mol) of p-cumylphenol and 1.3 ml of triethylamine in 660 ml of methylene chloride and 260 ml of water was phosgenated for 32 min. at a rate of 1.5 gms/min. while maintaining the pH at 10.0 to 11.5 with aqueous sodium hydroxide. After the phosgenation was complete, the organic layer was separated and washed with dilute HCl and water. The solvent was flashed off by pouring the solution into boiling water. The polymer had a $M_w$ of 26,400 and a Tg of 178° C. The intrinsic viscosity (IV) was 0.441.

EXAMPLE 2

Alternative Preparation Of 2-methyl-3,3-bis(p-hydroxyphenyl)phthalimide (22 mol %)-BPA Copolycarbonate A slurry of 83.56 gms (0.3660 mol) of bisphenol-A (BPA) and 34.22 gms (0.1033 mol) of 2-methyl-3,3-bis(p-hydroxyphenyl)phthalimide (MPP) in 390 ml of methylene chloride and 360 ml of water was phosgenated for 34 min. at a rate of 1.5 gms/min. while maintaining the pH at 10.5 with aqueous sodium hydroxide. After the phosgenation was complete, 2.900 gms (0.01366 mol) of p-cumylphenol was added. The reaction mixture was stirred for 5 min., and then 2.0 ml of triethylamine was added. The reaction mixture was stirred for 15 min. at a pH of 10.0 to 11.0 after which time phosgene was added at a rate of 0.5 gms/min. for 5 min. at a pH of 10.0 to 11.5. After the phosgenation was complete, the organic layer was separated and washed with dilute HCl and water. The solvent was flashed off by pouring the solution into boiling water. The product polymer had a $M_w$ of 31,000 and a Tg of ~186° C.

EXAMPLES 3-6

The general procedure of Example 2, supra., was repeated four times, except that the proportions of phthalimide reactant were varied in Examples 4 and 5. The polymer physical properties are set forth below in Table I.

For comparative purposes, a control run was made, replacing the phthalimide reactant with an equal molar proportion of bisphenol-A. The glass transition temperature and weight average molecular weight is also set forth in the Table I, below.

TABLE I

| Effect Of MPP Level On Tg Of MPP/BPA Copolymers | | | |
|---|---|---|---|
| Example | Mol % MPP | Tg (°C.) | $M_w$ |
| Control | 0 | 148 | ~27,000 |
| 3 | 22 | 186 | 30,817 |
| 4 | 50 | 214 | 34,515 |
| 5 | 75 | 248 | 29,673 |
| 6 | 100 | 267 | 34,515 |

EXAMPLES 7-9

The procedure of Example 2, supra., was repeated three times, but with varied proportions of the 2-butyl-3,3-bis(p-hydroxyphenyl) phthalimide (BuPP) reactant. The proportions used, the glass transition temperatures and the weight average molecular weights observed are set forth in Table II, below.

TABLE II

| Example | Mol % BuPP | Tg (°C.) | $M_w$ |
|---|---|---|---|
| Control (see Examples 3-6) | 0 | 148 | ~27,000 |
| 7 | 22 | 175 | 30,350 |
| 8 | 50 | 196 | 38,900 |
| 9 | 100 | 224 | 19,000 |

As may be observed from the Tables I and II, the Tg of product copolycarbonate resins can be varied by selecting proportions of the phthalimide reactant.

EXAMPLES 10-12

The general procedure of Example 2, supra., was repeated an additional 3 times to obtain 3 different copolycarbonate resins of the invention. The three resins were separately fed to an extruder operating at a temperature of about 316° C. to extrude the resin into strands and the extruded strands were chopped into pellets. The pellets were then injection molded at a temperature of about 340° C. into test samples measuring 6.35 cm×1.27 cm×0.317 cm. and tested for physical properties.

The results of the testing are reported in the Table III, below.

TABLE III

| Properties Of 22 Mol % MPP Copolycarbonates | | | |
|---|---|---|---|
| Example No. | 10 | 11 | 12 |
| Physical Property | | | |
| $M_w$ | 25,300 | 25,100 | 25,800 |
| MVI (6.1 kg) | 16.4 | 18.4 | 10.0 |
| DTUL (°C. at 18 Kg/cm$^2$ | 326 | 325 | |
| Notched Izod (a) 125 mil, J/M | 250(0) | 224(0) | 278(0) |
| Notched Izod (a) 250 mil, J/M | 107(0) | 112(0) | |
| Double gated Izod 125 mil, J/M | 1873 | 1527 | 1446 |
| Dynatup (a) | 38.8(100) | 41.6(100) | |
| Tensile Properties | | | |
| Strength at yield (MPa) | 74 | 74 | |
| Strength at Break (MPa) | 66 | 66 | |
| Elongation (%) | 57 | 55 | |
| Flexural Modulas (MPa) | 2,324 | 2,325 | |
| Specific Gravity | 1.21 | 1.21 | |

(a) value in parenthesis is percentage ductile failures (yielding at fracture surface).

Samples of the three resins from Examples 10-12 were also tested for yellowing upon QUV aging and compared to a 22 mole % phenolphthalein resin (Example 17, infra.). The test results are set forth in Table IV, below.

TABLE IV

| | Change in YI On QUV Aging | | | | |
|---|---|---|---|---|---|
| Example No. | Resin Control (b) | 10 | 11 | 12 | 17 (22 mol % Phenolphthalein) |
| Total Light Exposure Time (Hours) | | | | | |
| 0 | 0 | 0 | 0 | 0 | 0 |
| 347 | 7 | 6 | 2 | 6 | N/A |
| 1000 | 9 | 11 | 6 | 9 | 20 | b. bisphenol-A based Polycarbonate, $M_w$ = 29,600 (Control).

Properties Of 22 Mol % MPP Copolymers

It will be seen from the Examples that at 22 mol % a good balance of DTUL and other physical properties can be obtained in the copolycarbonates of the invention.

Comparison Of High Heat Resins

It will be seen from the above Examples that the MPP copolymers offer an excellent balance of UV stability and toughness that is needed in applications such as lighting. Poly(estercarbonates) often have excellent toughness, but these resins yellow quickly because of the Photo Fries rearrangement [Bellius, D., Adv. Photochem., 1971. 8: p. 109]. The BPA polycarbonate control has excellent UV resistance but, does not have the DTUL required for many of these applications. Table IV shows that the resins of the invention yellow no more than the standard BPA based polycarbonate control in accelerated aging (QUV) and thus would be most useful in outdoor and/or lighting applications.

EXAMPLE 13

The general procedure of Example 2, supra. was repeated, except that the proportion of the phythalimide reactant was reduced to provide a 12 mol % MPP copolycarbonate. The product resin exhibited the following physical properties:

TABLE V

| Property | |
| --- | --- |
| $M_w$ | 31,000 |
| MVI (6.1 kg) | 10.1 |
| DTUL (°C.) at 18 Kg/cm$^2$ | 150 |
| Notched Izod (a.) 125 mil (J/M) | 560(100) |
| Notched Izod (a.) 250 mil (J/M) | 150(0) |
| Double gated Izod (a.) (J/M) | 2161(100) |
| Dynatup (a.) | 38.4(100) | a. % Ductile failures (yielding at fracture surface) in parenthesis.

EXAMPLES 14–16

To 55 parts by weight of a polycarbonate of the invention prepared in accordance with Example 2, supra. and having a $M_w$ of 27,6000 there was blended 45 parts by weight of a bisphenol-A homopolymer polycarbonate (PC). The bisphenol-A homopolymer polycarbonate used in each example differed in weight average molecular weight, so that three different blend compositions were obtained. The blends were molded into test bars and tested for physical properties. The $M_w$ of the bisphenol-A based polycarbonate used in each blend and the physical properties observed are set forth in the TABLE VI, below.

TABLE VI

| Example No. | 14 | 15 | 16 |
| --- | --- | --- | --- |
| $M_w$ of Homopolymer PC Resin Used | 24,000 | 30,000 | 36,000 |
| MVI (1.2 kg) | 8.5 | 5.4 | 4.1 |
| Blend Tg (°C.) | 165 | 168 | |
| DTUL (°C. at 18 kg/cm$^2$) | 143 | 148 | 147 |
| Notched Izod (J/M)* (125 mil) | | | |
| At Room Temperature | 394 to 587 | 496 | 635(100) |
| 0° C. | 144(0) | 214(0) | 192(0) |
| −10° C. | 128(0) | 143(0) | 176(0) |
| (250 mil Izod)* (J/M) | 101(0) | 107(0) | |
| Double Gate (J/M) | 1735 | 1932 | 1932 |
| Dynatup (RT)* | 38.6(100) | 38.3(100) | 41.9(100) |

*% Ductile (bars exhibiting yielding at break) in parentheses.

EXAMPLES 17–19

The following Examples 17–19 are not examples of the invention but are presented for purposes of comparison. In the Examples 18 and 19 copolymers are prepared and tested which contain repeating or recurring polycarbonate chain units of the formula (I) given above but where R represents one of hydrogen or phenyl.

COMPARATIVE EXAMPLE 17 (PHENOLPHTHALEIN COPOLYMER)

The polymerization procedure of Example 1 supra., was repeated using 22 mol % of phenolphthalein in place of 2-methyl-3,3 bis(p-hydroxyphenyl)phthalimide. The reaction mixture was red colored until the polymerization was complete. The organic phase had to be acidified quickly to keep the solution from turning red (indicating hydrolysis). The solution was washed with dilute acid and water and isolated by steam precipitation. The resin was injection molded into 125 mil thick disks for QUV aging experiments (part $M_w$=29,100).

COMPARATIVE EXAMPLE 18 (R=PHENYL)

The polymerization procedure of Example 1 supra., was repeated using 22 mol % of 2-phenyl-3,3-bis(p-hydroxyphenyl)phthalimide in place of 2-methyl-3,3 bis(p-hydroxyphenyl)phthalimide. The solution was washed and isolated as described in Example 1 supra. The polymer had an $M_w$ of 27,100 and a Tg of 185. The intrinsic viscosity was 0.469.

Resin samples from Examples 1 and 18 were dried at ~130° C. overnight and melt pressed into rheology disks (125 mil×2.5 cm diameter). The sample where R=methyl afforded a clear light yellow disc free of voids. The sample where R=phenyl afforded a brownish disk that could not be prepared free of voids. The foaming and discoloration of the R=phenyl resin demonstrates its poor thermal stability.

COMPARATIVE EXAMPLE 19 (R=HYDROGEN)

The polymerization procedure of Example 1 supra., was repeated using 22 mol % of 3,3-bis(p-hydroxyphenyl)phthalimide in place of 2-methyl-3,3 bis(p-hydroxyphenyl)phthalimide. In this example, during the phosgene addition the sample emulsified. The emulsion could not be broken by addition of additional phosgene or by changing the pH of the mixture. These results demonstrate the problems of preparing copolymers with the 3,3-bis(p-hydroxyphenyl)phthalimide monomer which has a reactive amide hydrogen (reaction through the amide hydrogen was also noted by P. W. Morgan Linear Condensation Polymers From Phenolphthalein and Related Compounds, Journal of Polymer Science: Part A, (1964) 19: 437–459).

EXAMPLE 20

Disks (125 mil thick) of bisphenol-A based polycarbonate, 22 mol % MPP copolymer, and 22 mol % phenolphthalein copolymer were exposed to UV light, and the change in YI with time was measured. The results show that the MPP copolymers have UV stability as good as bisphenol-A derived polycarbonates. These results are surprising, based on the poor UV stability of the phthalimidine aromatic polyesters (See P. W. Morgan Linear Condensation Polymers From Phenolphthalein and Related Compounds, Journal of Polymer Science: Part A, (1964) 19: 437–459.). The phenolphthalein copolymers have a greater propensity to yellow which excludes their use in many applications.

Change in YI on QUV Aging

| Light Time (hrs) | Ave. Data from Exs. 10, 11, 12 (22 Mol % MPP Copolymer) | bisphenol-A Polycarbonate Resin Control* | Example 17 (22 Mol % Phenolphthalein Copolymer) |
| --- | --- | --- | --- |
| 0 | 0 | 0 | 0 |
| 750 |  | 7 | 15 |
| 1000 | 9 | 9 | 20 |
| 1500 | 13 | 12 |  |

*The resin control was a bisphenol-A based polycarbonate, $M_w = 29,600$.

What is claimed:

1. A synthetic polymeric resin containing recurring or repeating polycarbonate chain units of the formula:

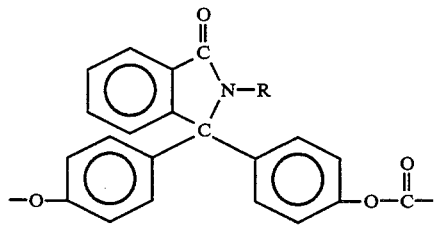

wherein R represents an alkyl having 1 to 12 carbon atoms.

2. The resin of claim 1 wherein R is methyl.

3. The resin of claim 1 wherein R is butyl.

4. A synthetic polymeric resin containing recurring or repeating polycarbonate chain units of the formula:

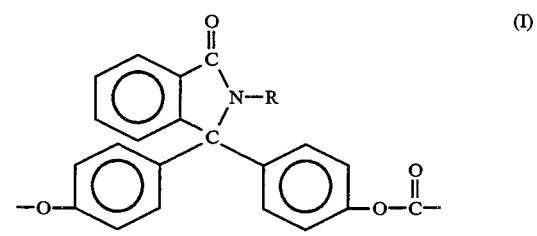

wherein R represents an alkyl having 1 to 12 carbon atoms; said chain units being interrupted by second chain units of formula:

wherein D is a divalent aromatic moiety of formula:

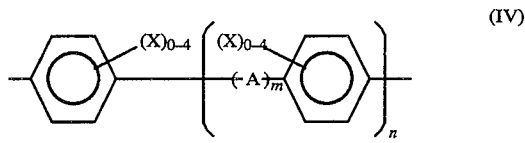

wherein A is a divalent hydrocarbon radical containing from 1 to about 15 carbon atoms; a substituted divalent hydrocarbon radical containing from 1 to about 15 carbon atoms and halogen; —S—; —SS—; —S(O)—; —S(O)$_2$—; —O—; or —C(O)—; each X is independently selected from the group consisting of halogen and a monovalent hydrocarbon radical selected from the group consisting of an alkyl group of from 1 to about 8 carbon atoms, and aryl of from 6–18 carbon atoms, an aralkyl group of from 7 to about 14 carbon atoms, an alkaryl group of from 7 to about 14 carbon atoms, an alkoxy group of from 1 to about 8 carbon atoms, and an aryloxy group of from 6 to about 18 carbon atoms; and m is zero or 1 and n is an integer of from 0 to 5.

5. The resin of claim 4 wherein the chain unit of formula (III) is residue of bisphenol-A after phosgenation.

6. The resin of claim 5 herein R is methyl.

7. The resin of claim 5 wherein R is butyl.

8. The resin of claim 5 containing dicarboxylic acid ester units in the polymer chain.

* * * * *